3,075,236
APPARATUS FOR PROCESSING KIDNEY KNOBS
Malden Mann, 6723 Parrish Ave., Hammond, Ind., and Eugene Friend, 3731 W. 114th Place, Chicago, Ill.
Filed May 5, 1960, Ser. No. 27,012
7 Claims. (Cl. 17—1)

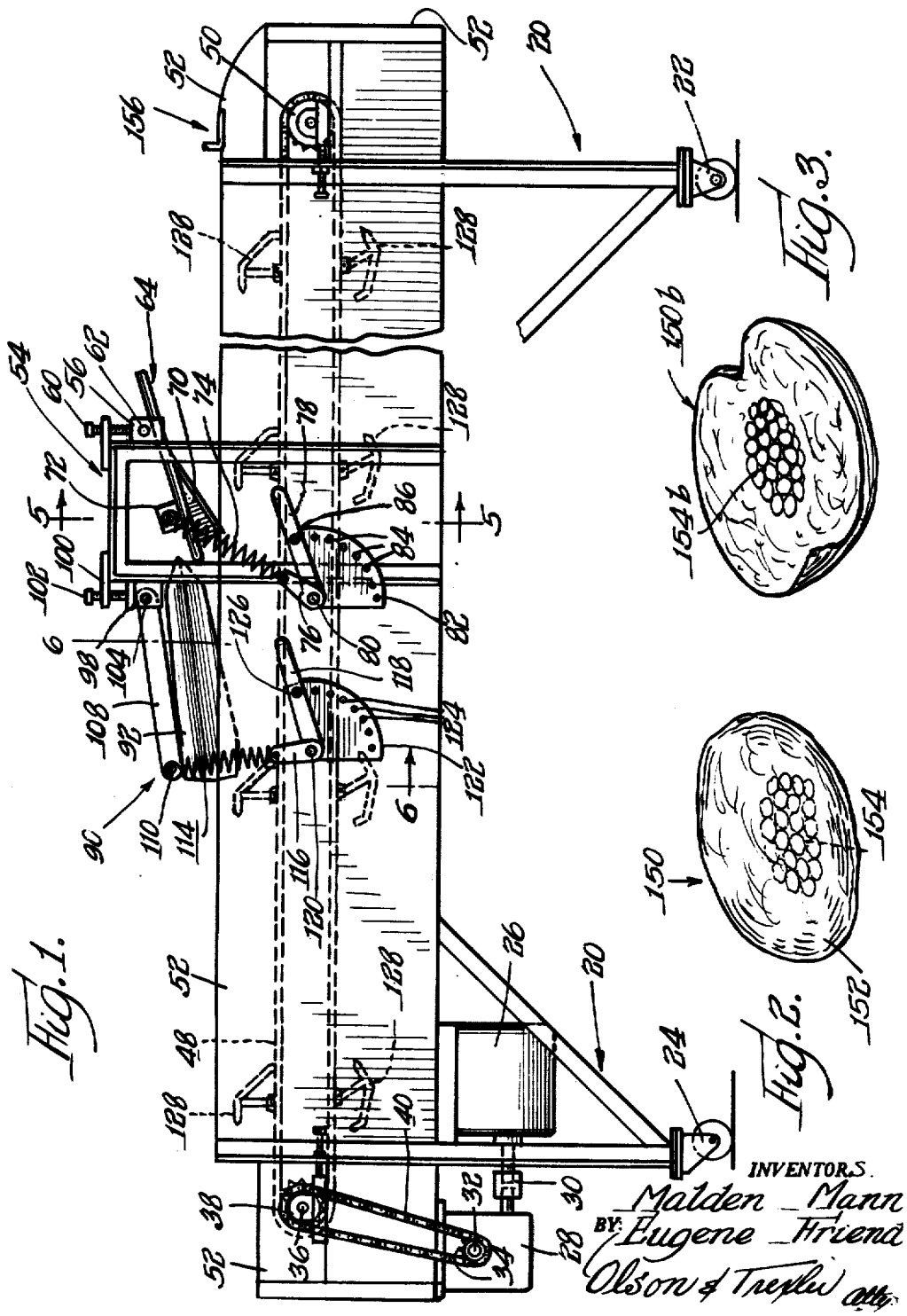

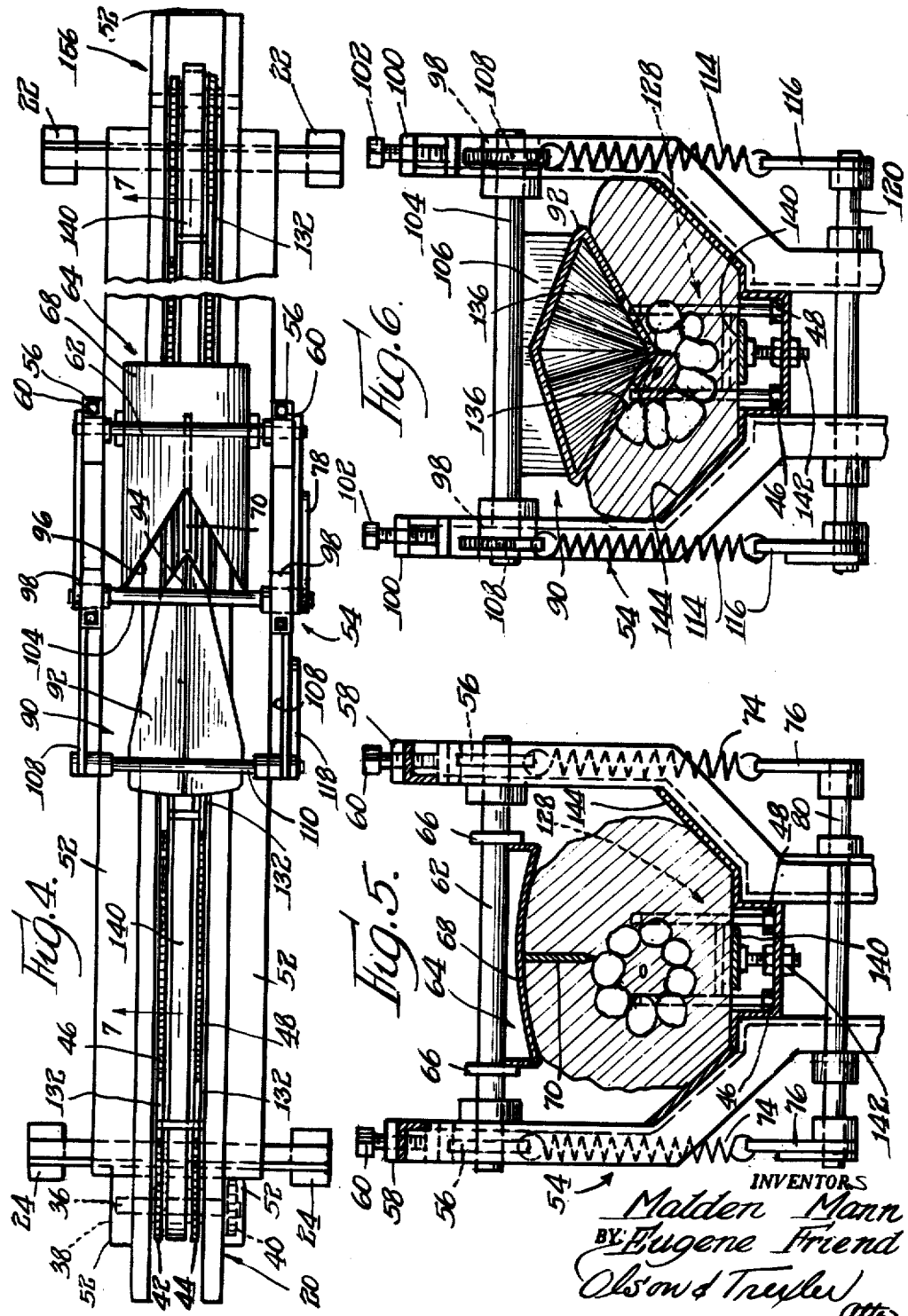

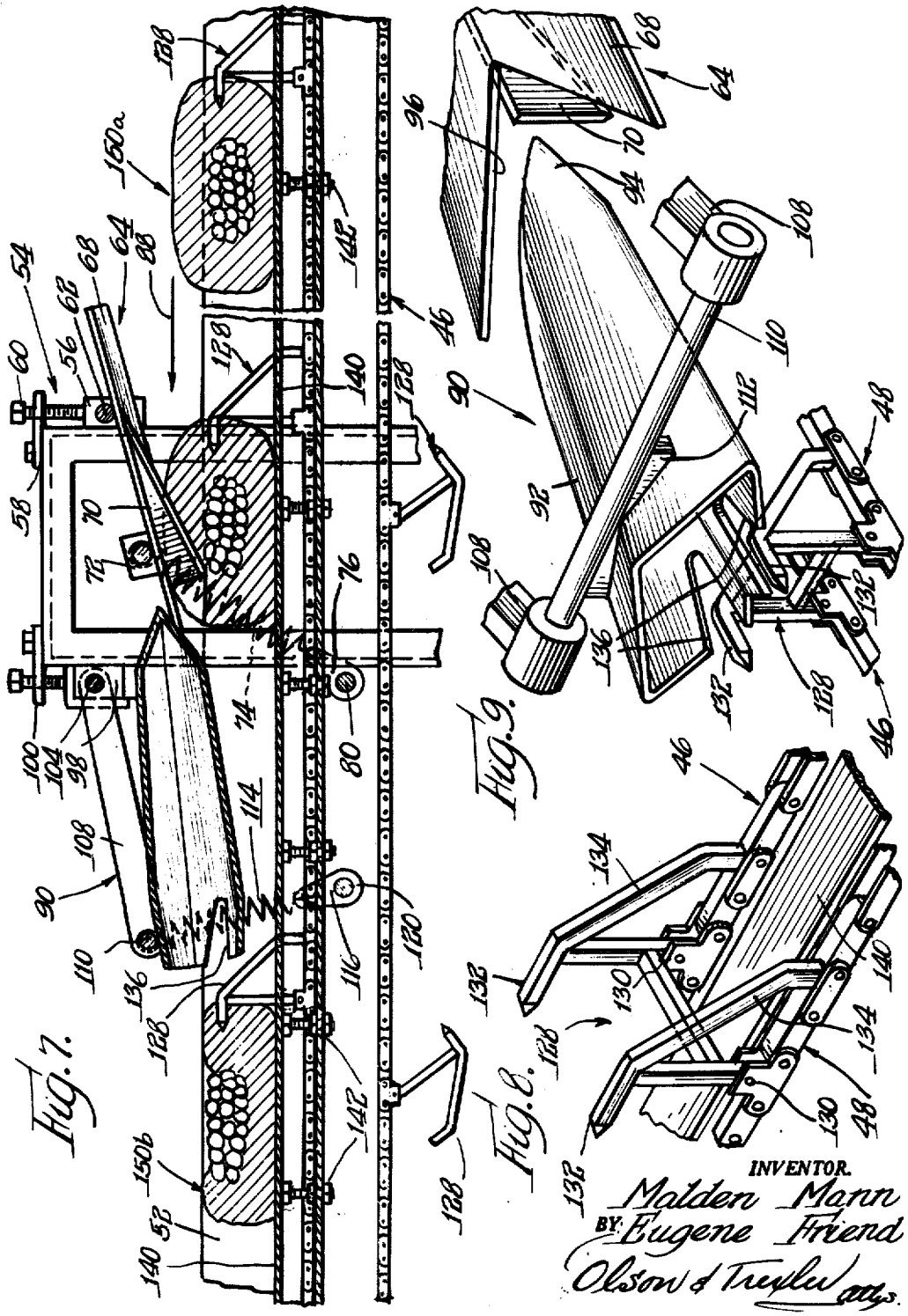

This invention relates generally to the butchering and dressing of animal carcasses and more particularly to apparatus for processing kidney knobs.

Kidneys are taken from an animal carcass in a lump of fat known as a kidney knob, there being an individual kidney knob for each of the kidneys. Beef kidney knobs normally vary from 5–15 pounds in weight; and in the larger sizes, the fat layer can exceed four inches in thickness. This fat layer is membranous in nature, and the kidney proper is difficult to remove from it.

Heretofore, kidneys have been removed from the kidney knob manually in an operation requiring a certain amount of skill and considerable physical strength. According to the conventional procedure, an incision is made in the kidney knob which is then split open using the fingers. While the knob is thus expanded, the kidney proper is pulled out by hand.

The kidney knobs are ordinarily removed from a number of carcasses during butchering to be stored under refrigeration until such time as it is convenient to process a large quantity of the knobs. The requisite refrigeration makes the fat layer hard and difficult to work with, and the operators frequently beat a refrigerated kidney knob on a butcher's block in order to soften it prior to making the incision for removing the kidney.

Accordingly, a general object of the present invention is to provide a novel apparatus by the use of which kidney knobs are now quickly, easily and economically processed.

More specific objects and features of the invention pertain to the particular structure and arrangements whereby the above object is attained.

Apparatus in accord with the invention includes means for cutting into the fat layer of a kidney knob including a vertically aligned knife affixed in depending relationship to a horizontally disposed pressure plate; means for spreading and partially disintegrating the fat layer in order to expose the kidney proper for removal, the spreading means being arranged in sequence with the cutting means processwise subsequent thereto, the spreading means including a projectile-shaped spreader adapted to enter progressively the incision made by the cutting means; means for vertically supporting a kidney knob against the cutting means and the spreading means; and continuously operable conveyor means for delivering kidney knobs into processing relationship with the cutting means and the spreading means.

In order that the principle of the invention may be readily understood, a single embodiment thereof applied to the processing of beef kidney knobs but to which the application is not to be restricted, is shown in the accompanying drawings wherein:

FIG. 1 is a side-elevational view partially in broken outline showing apparatus for processing kidney knobs constructed in accordance with the invention;

FIG. 2 is a perspective view of a kidney knob showing the kidney in broken outline;

FIG. 3 is a perspective view of the kidney knob of FIG. 2 showing the knob split open;

FIG. 4 is a plan view of the apparatus of FIG. 1;

FIG. 5 is an enlarged view taken through the section 5—5 of FIG. 1;

FIG. 6 is an enlarged view taken through the section 6—6 of FIG. 1;

FIG. 7 is an enlarged side-elevational cross-sectional view of the processing section of the apparatus of the invention, taken through the section 7—7 of FIG. 4;

FIG. 8 is an enlarged perspective view of a kidney knob holding assembly used in the apparatus of the invention; and FIG. 9 is an enlarged, perspective view of the projectile-shaped spreader and showing a portion of the cutting means of the invention.

Referring now in detail to the drawings, specifically to FIG. 1, apparatus for processing beef kidney knobs will be seen to include a framework 20 which is preferably mounted on fixed casters 22 at one end and on swivel casters 24 at the opposite end. The framework 20 supports a motor 26, and the motor 26 is arranged to drive a speed reducer 28 through a coupling 30.

From the speed reducer 28, there extends an output shaft 32 which has a small diameter sprocket 34 mounted to its free end. A shaft 36 is journaled in a fixed position relative to the framework 20 spaced-apart from the shaft 32; and the shaft 36 has a large diameter sprocket 38 fixed adjacent one end. A continuous chain 40 interconnects the small diameter sprocket 34 and the large diameter sprocket 38 in order to drive the shaft 36.

As will be seen in FIG. 4, shaft 36 carries two similar sprockets 42 and 44; and these latters sprockets are adapted to operate or drive a conveyor means comprising a pair of parallel disposed link chains 46 and 48, each of the chains 46 and 48 being arranged in a horizontally elongated, vertical loop. A number of idler sprockets 50 are suitably aligned along the longitudinal axis of the framework 20 in order to support and direct the chains 46 and 48.

For purposes of protecting those persons working in the vicinity of the apparatus, the movable chains 40, 46 and 48 are provided with appropriate, sheet metal guards or shrouds 52; and as will be seen in FIGS. 1 and 4, the several shrouds or guards 52 extend above, below and beyond the several chains by a suitable distance.

With reference to FIGS. 1, 4 and 7, a superstructure 54 will be seen mounted on the framework 20 to define a processing section. A pair of pivot blocks 56 are mounted to the superstructure 54 beneath support plates 58 by means of machine screws 60, screws 60 providing vertical adjustment for the blocks 56. A pivot bar 62 extends between the blocks 56; and as is best shown in FIG. 5, a cutting means 64 is affixed to the bar 62 by rings 66 to be swingable in a vertical arc.

The cutting means 64 includes a horizontally disposed pressure plate 68 to the underside of which is secured a knife blade 70. Knife blade 70 desirably tapers in a generally downward direction toward the trailing edge of the pressure plate 68, as is indicated in FIG. 7. Furthermore, knife blade 70 may be welded to the plate 68 or bolted thereto in positionally adjustable relationship, as is desired.

Returning now to FIG. 1, a transverse bar 72 will be seen fixed adjacent the trailing end of pressure plate 68; and tension springs 74 are attached between the ends of bar 72 and cooperating links 76 aligned therebeneath. Each of the links 76 is secured to a crank arm 78, and both the link 76 and the arm 78 are adapted to rotate about the pivot defined by a rod 80. An indexing plate 82 is fastened to the framework 20 to present a number of arcuately arranged, horizontal holes 84 in alignment with a hole 86 situated transversely in the crank arm 78 a suitable radial distance from pivot rod 80. By means of this arrangement, the tension in springs 74 can be regulated; and when a desired tension is achieved, a pin may be thrust through the hole 86 and through an appropriately positioned hole 84 to establish fixedly the desired tension.

Considering that the upper portions of chains 46 and 48 are adapted to be transported in the general direction indicated in FIG. 7 by the arrow 88, a spreader means 90 is advantageously disposed processwise subsequent to the cutting means 64. As will be seen in FIG. 9, the spreading means 90 includes a hollow, projectile-shaped spreader 92 terminating in an apex 94; and turning to FIG. 6, the spreader 92 is shown to evolve from the apex 94 into a narrow wedge and thence to a broadly spread diamond shape toward the rear. The pressure plate 68 is provided with a rearwardly opening, triangular notch 96 within the general confines of which the apex 94 is disposed in spaced-apart relationship. This latter arrangement is illustrated in FIG. 4.

The spreader 92 is arranged to be vertically pivotal, and the means employed to implement this arrangement include a pair of pivot blocks 98 which, as is shown in FIG. 7, are mounted to the superstructure 54 beneath support plates 100. Machine screws 102 are utilized for this mounting and for providing vertical adjustment of the blocks 98. A pivot rod 104 extends between the blocks 98; and as will be seen from an inspection of FIG. 6, the spreader 92 is secured to the pivot rod 104 by a yoke element 106.

With reference to FIGS. 7 and 9, two link arms 108 extend between the ends of pivot rod 104 and a rod 110. A yoke element 112 is mounted to the rod 110 to be secured adjacent the trailing end of spreader 92, as is particularly well shown in FIG. 9.

With reference again to FIG. 1, tension springs 114 extend between the ends of rod 110 and a link 116 which is affixed to a crank arm 118, the link 116 and the crank arm 118 being arranged to be rotatable about the pivot defined by bar 120. An indexing plate 122 is secured relative to the framework 20 and displays a number of horizontal holes 124 in arcuate alignment about the bar 120. The crank arm 118 is apertured with a hole 126 disposed a suitable radial distance from the rod 120 so as to be alignable with the holes 124. Accordingly, when suitable tension has been adjusted in the springs 114 by means of the crank arm 118, the crank arm 118 can be positionally fixed by means of a pin urged into the hole 126 and an appropriate one of the holes 124.

In accordance with a feature of the invention, a number of kidney knob holding assemblies, such as the assembly 128 shown in FIG. 8, are spaced along the chains 46 and 48. The holding assemblies are swingably mounted to corresponding links of the chains 46 and 48 as by pivot pins 130. Each of the holding assemblies 128, furthermore, comprises two upstanding, horizontally extending prongs 132 which are spaced-apart by the same distance that separates the chains 46 and 48. Moreover, the prongs 132 have backing bars 134 secured to their trailing ends, each backing bar 134 being adapted to abut with its free end a link in the respective chain.

As will be seen in FIG. 9, the trailing end of spreader 92 is provided with cutouts 136 for passing the prongs 132.

In accordance with another feature of the invention, a narrow, center support or elongated table 140 extends along the longitudinal axis of the apparatus between and spaced-apart from the chains 46 and 48 a small distance above the upper course of the loops thereof. This arrangement of the table 140 is indicated in FIG. 7; and as will be seen there, support elements 142 are appropriately arranged to carry the table 140.

The table 140 is arranged to support a kidney knob while it is being processed, as will be brought out more fully hereinafter; and in the area of the processing section itself, means are provided for further supporting the kidney knob during the cutting and spreading operations. These means include a longitudinally elongated, trough-like element 144 which is arranged beneath the cutting means 64 and beneath the spreading means 90 in accordance with the showing of FIGS. 5 and 6.

The cutting means 64, the spreading means 90, the guards 52, the table 140 and the elements 144 are desirably fabricated from stainless steel for sanitation and for corrosion resistance.

For purposes of affording a more complete understanding of the invention, it is advantageous now to provide a functional description of the mode in which the component parts cooperate.

Assuming that a quantity of kidney knobs of approximately the same size and weight have been accumulated, the apparatus of the invention will be prepared for use by adjusting the tension in springs 74 and 114 as has been described hereinabove. Furthermore, the heights of the cutting means 64 and the spreading means 90 above table 140 will be adjusted respectively by the screws 60 and 102. An appropriate adjustment of the first of these heights will insure the knife 70 making an incision in the kidney knob fairly close to or actually cutting the surface of the kidney. Proper vertical adjustment of the spreading means 92 will insure the application of sufficient pressure on the kidney knob to spread the incision made by the knife 70 and to disintegrate the fat layer partially. These respective arrangements are illustrated in FIGS. 5 and 6.

With the apparatus properly adjusted for the batch of kidney knobs to be processed, motor 26 will be energized from a suitable source in order to apply motive power to the chains 46 and 48 whereby to drive them in the direction indicated by arrow 88. Thereafter, kidney knobs, such as the kidney knob 150 shown in FIG. 2, will be impaled by hand individually on the kidney knob holding assemblies 128.

In FIG. 2, the kidney knob 150 will be seen to include a fat layer 152 and a kidney proper 154; and when a holding assembly 128 has been uprighted at the lead end 156 of the apparatus, a kidney knob can be readily impaled with the prongs 132 entering the fat layer. It is to be recognized that the kidney knobs will enjoy a certain amount of support from the table 140 after they have been impaled on the prongs 132. A properly impaled kidney knob 150a is indicated in FIG. 7.

Subsequent to being impaled, the kidney knob will be pushed or delivered into contact with the knife blade 70; and springs 74 will prevent the knife 70 from rising up and out of the horny fat layer surrounding the kidney. With reference to FIG. 5, pressure plate 68 rides on the exterior of the kidney knob tending to hold the kidney knob down against the table 140 and the trough-like element 144.

When the knife 70 is properly adjusted for the size of kidney knobs being processed, the positioning of the kidney knob between the pressure plate 68 and the table 140 will also tend to keep the knife 70 from cutting so deeply into the kidney knob as to incur a deep incision or substantial severing of the kidney proper. It is recognized that the generally eccentric location of the kidney within the kidney knob makes perfect adjustment of knife 70 impossible; however, shallow incisions in the kidney proper have not proved to be objectionable from a marketing or use standpoint.

As the kidney knob passes from the cutting means 64, the apex 94 of the spreading means 90 enters the incision made by the knife 70; and in accord with the showing of FIG. 6, the progressively broadening shape of the spreader 92 will cause the fat layer of the kidney knob to be pried apart. Since this fat layer is somewhat friable, though tough, pressure from the spreader 92 also tends partially to disintegrate it. However, the kidney proper, being somewhat resilient, is not harmed by the force applied by the spreader 92.

It is to be pointed out also, with reference to FIG. 6, that the table 140 and the element 144 support the kidney knob against the vertical pressure imposed by spreader 92. Furthermore, it is to be recognized that the back-up bars 134 of the kidney knob holding assemblies 128 prevent the kidney knob from pivoting away from the cutting means 64 and from the spreading means 90 as the kidney knob is being pushed through the processing section of the apparatus.

A kidney knob 150b which has been processed is shown in FIGS. 3 and 7. There, the kidney knob 150b will be seen to have the fat layer parted exposing the kidney 154b. When the kidney knob is thus split open, the kidney itself can be pulled out easily by hand and the fat layer removed from the holding assembly 128 to be discarded or subjected to subsequent rendering.

Thus, kidney knobs will be continuously processed by impaling kidney knobs on the holding assemblies 128 at the lead end 156 of the apparatus and by separating the kidney proper from the fat layer after the knob has been pushed through the processing section of the apparatus. When kidney knobs are handled in this manner, the processing is achieved in an easy, quick and economical manner.

It will be recognized that kidney knobs of widely varying size can be processed by the appartus of the invention by vertically adjusting the cutting means 64 and the spreading means 90 by means of screws 60 and 102. In addition, proper tension in the springs 74 and 114 is readily adjustable to accommodate different sized kidney knobs.

The specific example herein shown and described should be considered as illustrative only. Various changes in structure will, no doubt, occur to those skilled in the art; and these changes are to be understood as forming a part of this invention insofar as they fall within the spirit and scope of the appended claims.

The invention is claimed as follows:

1. Apparatus for processing kidney knobs comprising: means for cutting into the fat layer of a kidney knob; means for spreading and partially disintegrating said fat layer whereby to expose the kidney proper for removal, said spreading means being arranged in sequence with said cutting means processwise subsequent thereto, said spreading means including a projectile-shaped spreader adapted to enter progressively the incision made by said cutting means, said spreader having a forward apex spaced closely to the trailing end of said cutting means, a narrow wedge-shaped portion evolving from said apex, and a broadly spread portion trailing said wedge-shaped portion; means for supporting a said kidney knob against said cutting and said spreading means; and conveyor means for forcibly delivering kidney knobs into processing relationship between said supporting means and said cutting and said spreading means, the delivering action of said conveyor means causing a compressive force to be applied to a said conveyably positioned kidney knob simultaneously with a spreading force whereby mechanically to break down said fat layer exposing the kidney proper.

2. Apparatus for processing kidney knobs comprising: means for cutting into the fat layer of a kidney knob; means biasing said cutting means into engagement with a said kidney knob; means for spreading and partially disintegrating said fat layer whereby to expose the kidney proper for removal, said spreading means being arranged in sequence with said cutting means processwise subsequent thereto; means biasing said spreading means into engagement with a said kidney knob; means for supporting a said kidney knob against said biased cutting and spreading means; and conveyor means for forcibly delivering kidney knobs into processing relationship with said cutting and said spreading means, said supporting means being spaced apart from said spreading means by a vertical distance less than the height of a said kidney knob, the delivering action of said conveyor means causing a compressive force to be applied to a said conveyably positioned kidney knob simultaneously with a spreading force whereby mechanically to break down said fat layer exposing the kidney proper.

3. Apparatus for processing kidney knobs in accordance with claim 2 wherein said second and said fourth mentioned means are adjustable.

4. Apparatus for processing kidney knobs comprising: means for cutting into the fat layer of a kidney knob including a vertically aligned knife affixed in depending relationship to a horizontally disposed pressure plate, said pressure plate terminating in a tapering, rearwardly opening notch; means for spreading and partially disintegrating said fat layer whereby to expose the kidney proper for removal, said spreading means being arranged in sequence with said cutting means processwise subsequent thereto, said spreading means including a projectile-shaped spreader adapted to enter progressively the incision made by said cutting means, said spreader having a pointed forward end spaced closely to the trailing end of said knife and disposed at least partly between the edges of said notch; means for vertically supporting a said kidney knob against said spreading means, said supporting means cooperating with said spreading means in partially disintegrating said fat layer; and conveyor means for forcibly delivering kidney knobs into processing relationship with said cutting and said spreading means.

5. Apparatus for processing kidney knobs in accordance with claim 4 wherein said first and said second mentioned means are vertically pivotal and wherein said apparatus further comprises means for adjustably biasing said cutting means into engagement with a said kidney knob and means adjustably biasing said spreading means into engagement with a said kidney knob.

6. Apparatus for processing kidney knobs comprising: means for cutting into the fat layer of a kidney knob; means for spreading and partially disintegrating said fat layer whereby to expose the kidney proper for removal, said spreading means being arranged in sequence with said cutting means processwise subsequent thereto; means for vertically supporting a said kidney knob against said cutting and said spreading means; and conveyor means for forcibly delivering kidney knobs into processing relationship with said cutting means and said spreading means, including a drivable chain and a plurality of kidney knob holding assemblies spaced along said drivable chain, each of said holding assemblies including at least one upstanding prong adapted to impale a said kidney knob and a backing element secured to said prong in trailing relationship whereby transportably to support said impaled kidney knob horizontally against said cutting and said spreading means, said vertically supporting means being spaced apart from said spreading means by a vertical distance less than the height of a said kidney knob, the delivering action of said conveyor means causing a compressive force to be applied to a said conveyably positioned kidney knob simultaneously with a spreading force whereby mechanically to break down said fat layer exposing the kidney proper.

7. Apparatus for processing kidney knobs comprising: means for cutting into the fat layer of a kidney knob including c vertically aligned knife affixed in depending relationship to a horizontally disposed pressure plate, said plate being pivotal in a vertical arc and terminating in a tapering, rearwardly opening notch; means adjustably biasing said cutting means into engagement with a said kidney knob; means for spreading and partially disintegrating said fat layer whereby to expose the kidney proper for removal, said spreading means being arranged in sequence with said cutting means processwise subsequent thereto, said spreading means including a vertically pivotal, projectile-shaped spreader adapted to enter progressively the incision made by said cutting means, said spreader having a pointed forward end spaced closely to the trailing end of said knife and disposed at least partly between the edges of said notch; means adjustably biasing said spreading means into engagement with a said kidney knob; means for vertically supporting a said kidney knob against said cutting and said spreading means; and continuously operable conveyor means for horizontally delivering kidney knobs into processing relationship with said cutting and said spreading means, including a drivable chain and a plurality of kidney knob holding assemblies spaced along said drivable chain, each of said assemblies transportably supporting a said kidney knob horizontally against said cutting and said sperading means, said vertically supporting means being spaced apart from said spreading means by a vertical distance less than the height of a said kidney knob, the delivering action of said conveyor means causing a compressive force to be applied to a said conveyably positioned kidney knob simultaneously with a spreading force whereby mechanically to break down said fat layer exposing the kidney proper.

References Cited in the file of this patent
UNITED STATES PATENTS

| | | |
|---|---|---|
| 2,695,418 | Patterson et al. | Nov. 30, 1954 |
| 2,735,466 | Krstinich | Feb. 21, 1956 |
| 2,924,844 | Hill | Feb. 16, 1960 |